United States Patent
Ra et al.

(10) Patent No.: US 10,110,977 B2
(45) Date of Patent: Oct. 23, 2018

(54) PHOTONIC FRAME SWITCHING SYSTEM DETERMINING MOMENT OF TRANSMITTING PHOTONIC FRAME BASED ON TIME USED FOR CHANGING WAVELENGTH OF TUNABLE LASER DIODE

(71) Applicant: Electronics and Telecommunications Research Institute, Daejeon (KR)

(72) Inventors: YongWook Ra, Daejeon (KR); Yunjoo Kim, Seongman-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/658,374

(22) Filed: Jul. 24, 2017

(65) Prior Publication Data

US 2018/0199118 A1    Jul. 12, 2018

(30) Foreign Application Priority Data

Jan. 6, 2017   (KR) ........................ 10-2017-0002504

(51) Int. Cl.
*H04J 14/00* (2006.01)
*H04Q 11/00* (2006.01)
*H04J 14/02* (2006.01)
*H04B 10/70* (2013.01)
(Continued)

(52) U.S. Cl.
CPC ....... *H04Q 11/0005* (2013.01); *H04B 10/503* (2013.01); *H04B 10/70* (2013.01); *H04J 14/0258* (2013.01); *H04L 5/0055* (2013.01); *H04Q 11/0066* (2013.01); *H04Q 2011/005* (2013.01); *H04Q 2011/0016* (2013.01);
(Continued)

(58) Field of Classification Search
CPC ........... H04Q 11/0066; H04Q 11/0062; H04Q 11/0005; H04Q 2011/0075; H04Q 2011/0073
USPC .......................................... 398/54
See application file for complete search history.

(56) References Cited

U.S. PATENT DOCUMENTS

| 5,450,507 | A | 9/1995 | Shin et al. |
| 6,934,471 | B1 | 8/2005 | Carvey et al. |
| 2008/0080861 | A1 | 4/2008 | Chung et al. |

(Continued)

FOREIGN PATENT DOCUMENTS

KR    10-1149988    5/2012

*Primary Examiner* — Don N Vo
(74) *Attorney, Agent, or Firm* — Rabin & Berdo, P.C.

(57) ABSTRACT

A photonic frame switching system may include a main controller and at least one photonic frame wrapper line card. The main controller may determine a point in time at which a photonic frame wrapper line card transmits a photonic frame by allocating a time slot to the photonic frame wrapper line card. When the photonic frame switching system includes a plurality of photonic frame wrapper line cards, points in times at which the plurality of photonic frame wrapper line cards transmits the photonic frames may be synchronized. In particular, when a portion of the plurality of photonic frame wrapper line cards transmit a plurality of photonic frames having different destinations, points in times at which all of the plurality of photonic frame wrapper line cards transmits the photonic frames may be adjusted based on a latency by a destination change.

18 Claims, 8 Drawing Sheets

(51) Int. Cl.
*H04L 5/00* (2006.01)
*H04B 10/50* (2013.01)

(52) U.S. Cl.
CPC ............... *H04Q 2011/0033* (2013.01); *H04Q 2011/0045* (2013.01)

(56) References Cited

U.S. PATENT DOCUMENTS

2014/0334821 A1    11/2014  Mehrvar
2015/0312659 A1*  10/2015  Mehrvar ............ H04Q 11/0005
                                                                   398/45
2017/0094378 A1*   3/2017  Kiaei .................... H04B 10/70
2017/0261689 A1*   9/2017  Mansouri Rad ..... G02B 6/2773

* cited by examiner

PHOTONIC FRAME SWITCHING SYSTEM DETERMINING MOMENT OF TRANSMITTING PHOTONIC FRAME BASED ON TIME USED FOR CHANGING WAVELENGTH OF TUNABLE LASER DIODE

CROSS-REFERENCE TO RELATED APPLICATION(S)

This application claims the priority benefit of Korean Patent Application No. 10-2017-0002504 filed on Jan. 6, 2017, in the Korean Intellectual Property Office, the disclosure of which is incorporated herein by reference for all purposes.

BACKGROUND

1. Field

One or more example embodiments relate to a photonic frame switching system for processing a photonic frame and a method performed by the system.

2. Description of Related Art

Network switch studies have focused on enhancing a throughput and a latency associated with Internet protocol traffic to solve issues, such as a sudden increase in a power consumption amount at a data center configured based on an electrical switch and a router, an increase in network latency, an increase in networking cost, scalability limit, and the like.

Internet protocol (IP) traffic of a data center in which packets are concentrated is expected to reach several zeta bytes. Also, various types of service providing servers are on the exponential increase and a network switch having mass capacity is required. Currently, research on switching a large capacity frame by constructing a data center based on photonic switching technology is actively conducted.

SUMMARY

One or more example embodiments provide a photonic frame switching system that may support switching of a high throughput photonic frame.

One or more example embodiments also provide a photonic frame switching system including a plurality of photonic frame wrapper line cards capable of synchronizing photonic frame transmission points in times regardless of a latency of a tunable laser diode (TLD).

According to an aspect, there is provided a photonic frame switching system including a plurality of photonic frame wrapper line card each configured to generate a photonic frame by merging a plurality of packets based on a destination; and a main controller configured to transfer, to the plurality of photonic frame wrapper line cards, a scheduling acknowledgement (ACK) signal including information associated with a time slot that indicates a time at which the plurality of photonic frame wrapper line cards simultaneously transmits the photonic frames. Each of the plurality of photonic frame wrapper line cards is configured to insert a preset guard time between a plurality of time slots corresponding to the plurality of photonic frames in response to transmitting a plurality of photonic frames having different destinations.

Each of the plurality of photonic frame wrapper line cards may include a tunable laser diode configured to output the photonic frame using a wavelength corresponding to the destination; and a photonic frame wrapper apparatus configured to request the plurality of photonic frame wrapper line cards to insert the guard time that is set based on a time at which the tunable laser diode changes the wavelength, in response to transmitting the plurality of photonic frames having different destinations.

The photonic frame wrapper apparatus may be configured to identify a destination of each of the plurality of packets by parsing a header of each of the plurality of packets, to classify the plurality of packets based on an output port corresponding to the identified destination, to store the plurality of classified packets in a packet memory, and to store at least one of an output port corresponding to each of the plurality of classified packets, an address of a memory in which each of the plurality of classified packets is stored, and a length of each of the plurality of classified packets in a virtual output queue memory.

The photonic frame wrapper apparatus may be configured to request the main controller to generate the scheduling ACK signal when a number of the plurality of packets stored in the virtual output queue memory exceeds a preset threshold.

The photonic frame wrapper apparatus may be configured to initialize a time slot counter based on the scheduling ACK signal, to generate a time slot queue including information used to generate the photonic frame when the time slot counter matches a time slot value included in the scheduling ACK signal, to generate the photonic frame based on the generated time slot queue, and to output the generated photonic frame to the tunable laser diode in response to receiving a timing signal indicating a start of the time slot.

The photonic frame wrapper apparatus may be configured to increase a value of the time slot counter in response to receiving the timing signal when the time slot counter does not match the time slot value, and to determine whether the time slot counter matches the time slot value.

The photonic frame wrapper apparatus may be configured to insert a photonic preamble generated based on a different destination into a photonic frame that is subsequently transmitted among the plurality of photonic frames in response to transmitting the plurality of photonic frames having different destinations.

A photonic frame wrapper line card that most initially receives the scheduling ACK signal from the main controller may be configured to transmit, to remaining photonic frame wrapper line cards among the plurality of photonic frame wrapper line cards, a timing signal indicating a start of the time slot based on the received scheduling ACK signal.

The plurality of photonic frame wrapper line cards may be configured to output the generated photonic frame to a photonic switch fabric apparatus of which a switching path is determined for each wavelength, based on the time slot.

Each of the plurality of photonic frame wrapper line cards may be configured to extract a packet that is included in a photonic frame transferred to the photonic frame switching system, and to transmit the extracted packet to a corresponding server.

The main controller may be configured to generate the scheduling ACK signal so that the plurality of photonic frame wrapper line cards transmits the photonic frames in different time slots, respectively, when the plurality of photonic frame wrapper line cards transmits the photonic frames to the same destination.

According to an aspect, there is provided a photonic frame wrapper apparatus including a photonic frame wrapper inputter configured to generate a photonic frame based on a plurality of packets; and a synchronization processor configured to request a main controller connected to the photonic frame wrapper apparatus to allocate a time slot for transmitting the generated photonic frame.

The photonic frame wrapper inputter may include a header parser configured to identify a destination of each of the plurality of packets by parsing a header of each of the plurality of packets; a packet classifier configured to classify the plurality of packets based on an output port corresponding to the identified destination; a virtual output queue memory controller configured to store an output port corresponding to each of the plurality of classified packets, an address of a memory in which each of the plurality of classified packets is stored, and a length of each of the plurality of classified packets in a virtual output queue memory; a photonic frame generator configured to generate a photonic frame by merging the plurality of classified packets; and a scheduling processor configured to request the photonic frame generator to generate the photonic frame based on the allocated time slot.

The synchronization processor may be configured to request the main controller to allocate the time slot when a number of the plurality of packets stored in the virtual output queue memory exceeds a preset threshold.

The synchronization processor may be configured to transfer information associated with the time slot included in a scheduling ACK signal to the scheduling processor when the main controller transmits the scheduling ACK signal in response to the request.

The scheduling processor may be configured to initialize a time slot counter in response to receiving information associated with the time slot allocated by the main control, to generate a time slot queue including information used to generate the photonic frame when the time slot counter matches a time slot value included in the received information, to request the photonic frame generator to generate the photonic frame based on the generated time slot queue, and to request the photonic frame generator to start transmission of the generated photonic frame in response to receiving a timing signal indicating start of the time slot.

The scheduling processor may be configured to increase a value of the time slot counter in response to receiving the timing signal when the time slot counter does not match the time slot value, and to determine whether the time slot counter matches the time slot value.

The photonic frame wrapper apparatus may further include a wavelength tuning controller configured to insert a preset guard time between a plurality of time slots corresponding to a plurality of photonic frames in response to transmitting the plurality of photonic frames having different destinations.

The guard time may be determined based on a time at which a tunable laser diode configured to output the photonic frame changes a wavelength based on the destination.

The photonic frame wrapper apparatus may further include a photonic frame wrapper outputter configured to output a packet extracted from the received photonic frame to a corresponding server, in response to receiving the photonic frame.

According to example embodiments, it is possible to perform switching of a high throughput photonic frame.

Also, according to example embodiments, regardless of a latency of a TLD, it is possible to synchronize photonic frame transmission points in times.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
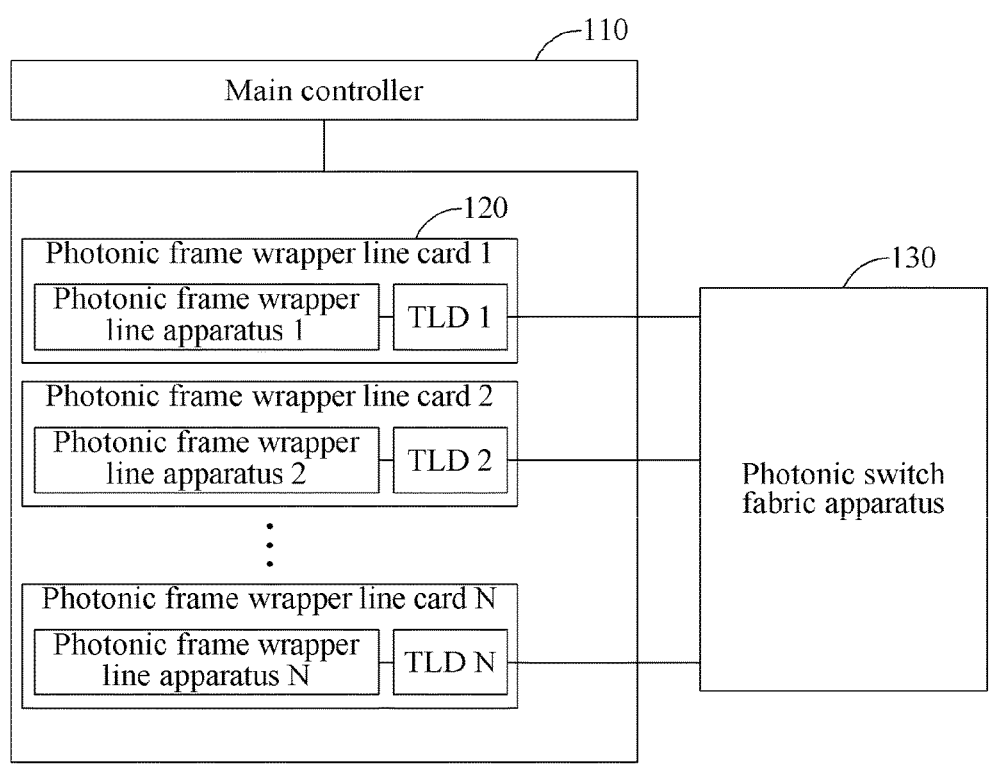
FIG. 1 is a diagram illustrating a structure of a photonic frame switching system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, without departing from the scope of the disclosure, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The example embodiments will be described with reference to the accompanying drawings. However, the present disclosure is not limited thereto or restricted thereby. Like reference numerals in the drawings refer to like elements throughout.

FIG. 1 is a diagram illustrating a structure of a photonic frame switching system according to an example embodiment.

The photonic frame switching system may include at least one photonic frame wrapper line card configured to process a photonic frame. FIG. 1 illustrates N photonic frame wrapper line cards 120.

The photonic frame wrapper line card 120 may include a photonic frame wrapper apparatus and a tunable laser diode (TLD). Once a packet is received, the photonic frame wrapper apparatus may generate a photonic frame based on the received packet. In detail, the photonic frame wrapper apparatus may generate the photonic frame by merging a plurality of packets based on a destination. The destination indicates a server or a terminal that receives the packet included in the photonic frame. The destination may include a network switch used to reach the server or the terminal to receive the packet. The photonic frame wrapper apparatus may transmit the generated photonic frame to the TLD.

Once the photonic frame is received, the photonic frame wrapper apparatus may divide the received photonic frame into at least one packet. The photonic frame wrapper apparatus may transmit the divided at least one packet to a corresponding server.

Referring to FIG. 1, the photonic frame switching system may include a main controller 110 configured to control the photonic frame wrapper line card 120. When the photonic frame switching system includes a plurality of photonic frame wrapper line cards 120, the main controller 110 may control a point in time at which each of the plurality of photonic frame wrapper line cards 120 transmits a photonic frame.

A time slot indicates a unit of a time divided based on a time section in which a single photonic frame is transmitted. The main controller 110 may control a point in time at which the photonic frame wrapper line card 120 transmits a photonic frame using a scheduling acknowledgement (ACK) signal that includes information associated with at least one time slot. At least one time slot included in the scheduling ACK signal is referred to as a time slot group.

The main controller 110 may control the plurality of photonic frame wrapper line cards 120 to simultaneously transmit the photonic frames using the scheduling ACK signal. The plurality of photonic frame wrapper line cards 120 may simultaneously transmit the photonic frames based on the scheduling ACK signal provided from the main controller 110. The time slot may represent a time in which the plurality of photonic frame wrapper line cards 120 simultaneously transmits the photonic frames.

In detail, referring to FIG. 1, when the packet is received, a photonic frame wrapper apparatus of each of the plurality of photonic frame wrapper line cards 120 may request the main controller 110 to perform scheduling associated with generation and transmission of the photonic frame.

The main controller 110 may receive a scheduling request from at least one photonic frame wrapper apparatus during a preset period of time. In response to the scheduling request, the main controller 110 may determine a time slot for transmitting a photonic frame. Once at least a predetermined number of scheduling requests are received from the plurality of photonic frame wrapper apparatuses, the main controller 110 may determine the time slot for transmitting a photonic frame. According to another example embodiment, the main controller 110 may determine the time slot for transmitting a photonic frame with respect to scheduling requests that are received within a predetermined period of time based on a point in time at which a first scheduling request is received.

The main controller 110 may determine a time slot to be serviced, based on a priority of the packet included in the photonic frame, a quality of service (QoS) policy, and the like. In response to the received scheduling request, the main controller 110 may allocate the time slot to the photonic frame wrapper line card 120. The main controller 110 may transmit a scheduling ACK signal including information associated with the determined time slot to the photonic frame wrapper apparatus that requests scheduling. The scheduling ACK signal may include information associated with the allocated time slot for each photonic frame wrapper line card 120.

The photonic frame wrapper apparatus of the photonic frame wrapper line card 120 that most initially receives the scheduling ACK signal among the plurality of photonic frame wrapper line cards 120 may transmit, to the remaining photonic frame wrapper line card(s) 120, a timing signal indicating start of the time slot. The plurality of photonic frame wrapper line cards 120 may simultaneously transmit the photonic frames using the timing signal. The photonic frame wrapper apparatus of the photonic frame wrapper line card 120 that most initially receives the scheduling ACK signal may transmit, to the remaining photonic frame wrapper line card(s) 120, a scheduling start signal to fit synchronization of the time slot. The plurality of photonic frame wrapper line cards 120 may synchronize photonic frame transmission points in times using the scheduling start signal.

According to an example embodiment, the main controller 110 may broadcast the scheduling ACK signal to the plurality of photonic frame wrapper line cards 120. Each of the plurality of photonic frame wrapper line cards 120 may identify, from the received scheduling ACK signal, at least one time slot that is allocated to each of the plurality of photonic frame wrapper line cards 120. The photonic frame wrapper apparatus of each of the plurality of photonic frame wrapper line cards 120 may identify the allocated time slot based on a synchronized time slot counter. The photonic frame wrapper apparatus may transmit the photonic frame to the TLD in the allocated time slot. The TLD may determine a wavelength of the photonic frame based on a destination of the photonic frame and may transmit the photonic frame having the determined wavelength to a photonic switch fabric apparatus 130. That is, the TLD may output the photonic frame using the wavelength corresponding to the destination.

The photonic frame switching system may include the photonic switch fabric apparatus 130 of which a switching path is determined for each wavelength. The photonic switch fabric apparatus 130 may include a plurality of input ports and a plurality of output ports respectively corresponding to the plurality of photonic frame wrapper line cards 120. Each of the plurality of output ports may be connected to the destination to which the photonic frame switching system transmits the photonic frame. Photonic frame transmission points in times of the plurality of photonic frame wrapper line cards 120 are synchronized in response to a scheduling start signal or a timing signal. Thus, it is possible to prevent a collision between the output ports of the photonic switch fabric apparatus 130.

The photonic switch fabric apparatus 130 may switch the photonic frame received from the photonic frame wrapper line card 120 to one of the plurality of output ports based on the wavelength of the photonic frame. Since the switching path of the photonic switch fabric apparatus 130 is determined for each wavelength, the photonic frame wrapper line card 120 may transmit the photonic frame to a specific destination by adjusting the wavelength of the photonic frame. The wavelength of the photonic frame may be determined based on a wavelength used by the TLD.

When the photonic frame wrapper line card 120 needs to transmit a plurality of photonic frames to different destinations, the TLD may change a wavelength to be used based on a destination of each of the photonic frames. While the TLD changes the wavelength, a predetermined amount of time may be used. When TLDs included in a portion of the plurality of photonic frame wrapper line cards 120 change the wavelength, photonic frame transmission points in times of the photonic frame wrapper line card 120 corresponding to the changed wavelength may different from those of other photonic frame wrapper line cards 120 corresponding to an unchanged wavelength.

Although a single TLD among TLDs included in the plurality of photonic frame wrapper line cards 120 changes the wavelength, the plurality of photonic frame wrapper line cards 120 may synchronize photonic frame transmission points in times using a guard time. The guard time may be determined to be greater than or equal to a time in which the TLD changes the wavelength. That is, when TLDs included in a portion of the plurality of photonic frame wrapper line cards 120 change the wavelength, all of the plurality of photonic frame wrapper line cards 120 may delay photonic frame transmission points in times by the guard time. The photonic frame wrapper line card 120 changing the wavelength of the TLD may request the remaining photonic frame wrapper line card(s) 120 to delay photonic frame transmission points in times thereof by the guard time.

For example, when it is assumed that a wavelength of a TLD 1 of a photonic frame wrapper line card 1 of FIG. 1 is changed to transmit a photonic frame having a destination from that of a photonic frame previously transmitted from the photonic frame wrapper line card 1, a photonic frame wrapper apparatus 1 of the photonic frame wrapper line card 1 may transmit, to a photonic frame wrapper line card 2 through a photonic frame wrapper line card N, a wavelength change notification signal indicating that the wavelength of the TLD 1 is changed. That is, the wavelength change notification signal may be generated when a single photonic frame wrapper apparatus transmits photonic frames having different destinations in adjacent time slots within a time slot group.

In response to receiving the wavelength change notification signal, photonic frame wrapper line apparatuses of the photonic frame wrapper line card 2 through the photonic frame wrapper line card N may insert the guard time between time slots. Also, the photonic frame wrapper apparatus 1 may insert the guard time between time slots. By simultaneously inserting the guard time between time slots, photonic frame transmission points in times of the photonic frame wrapper line cards 1 through N may be synchronized based on a point time at which the wavelength of the TLD 1 is changed.

According to an example embodiment, the plurality of photonic frame wrapper line cards 120 included in the photonic frame switching system may synchronize photonic frame transmission points in times based on the time slot allocated by the main controller 110. Further, when a portion of the plurality of photonic frame wrapper line cards 120 transmit photonic frames having different destinations in adjacent time slots, all of the plurality of photonic frame wrapper line cards 120 may synchronize again the photonic frame transmission points in times based on an amount of time used according to a destination change. Accordingly, the photonic frame switching system may enhance a transmission bandwidth efficiency of and may also support high throughput switching processing.

Figure 2:
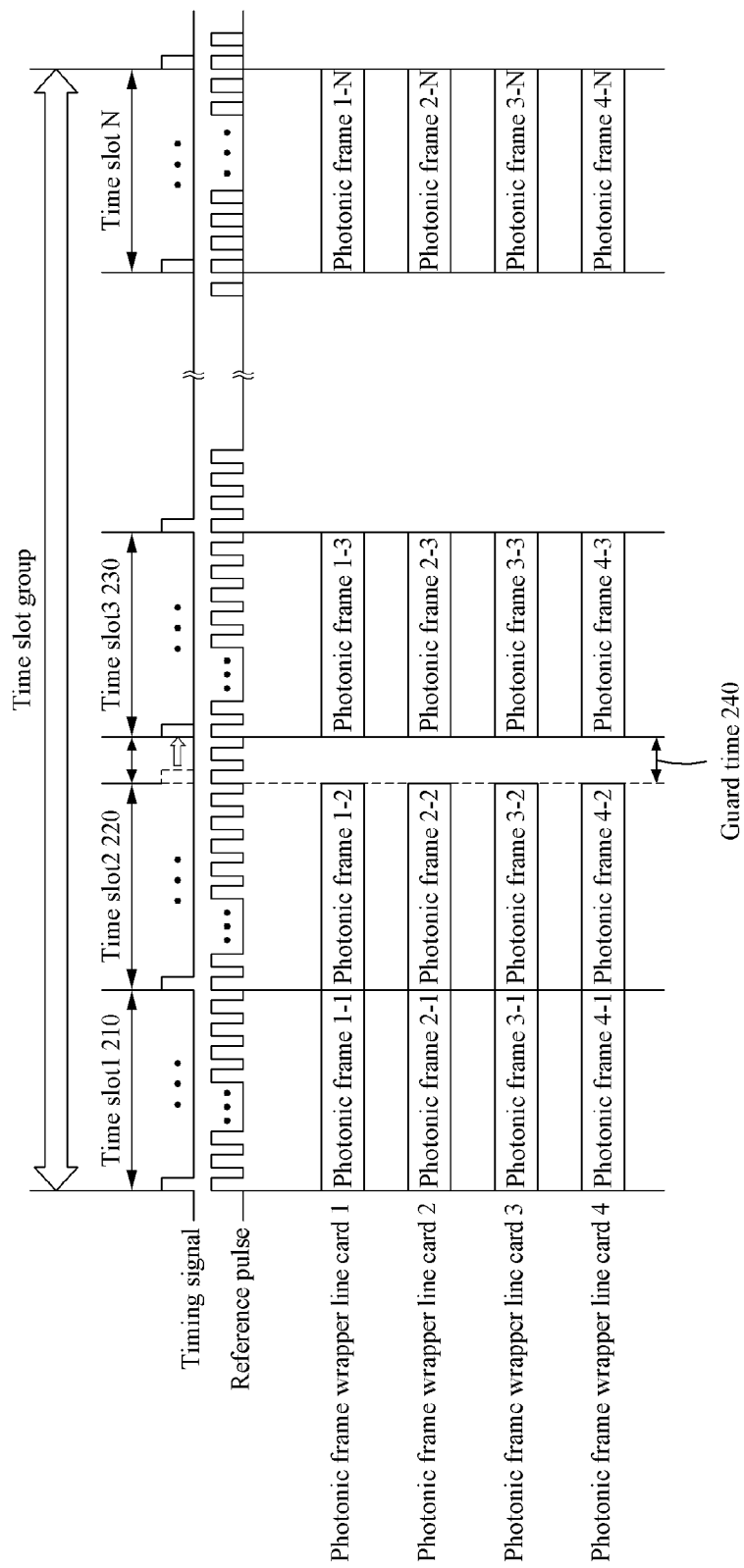
FIG. 2 is a diagram illustrating an example in which a plurality of photonic frame wrapper line cards included in a photonic frame switching system transmits a photonic frame based on a time slot and a guard time according to an example embodiment.

FIG. 2 is a diagram illustrating an example in which a plurality of photonic frame wrapper line cards included in a photonic frame switching system transmits photonic frames based on a time slot and a guard time according to an example embodiment. For clarity of description, it is assumed that the photonic frame switching system includes four photonic frame wrapper line cards.

Referring to FIG. 2, a photonic frame x-y refers to a photonic frame that is transmitted from a photonic frame wrapper line card x in a time slot y. At least one of photonic frame wrapper line cards 1, 2, 3, and 4 may request a main controller to generate a scheduling ACK signal. The main controller may allocate a time slot to a photonic frame wrapper line card that requests generation of the scheduling ACK signal. A time slot allocation result may be included in the scheduling ACK signal. When the main controller allocates a series of time slots to the photonic frame wrapper line card, the scheduling ACK signal may include information associated with a group of the series of time slots, for example, a time slot group. In FIG. 2, it is assumed that the main controller allocates N time slots. A plurality of packets having the same output port may be transmitted using at least one time slot.

A photonic frame wrapper line card that most initially receives the scheduling ACK signal may transmit, to other photonic frame wrapper line cards, a timing signal indicating start of a time slot based on the received scheduling ACK signal. When the photonic frame wrapper line card 1 most initially receives the scheduling ACK signal, the photonic frame wrapper line card 1 may transmit the timing signal indicating start of the time slot to the photonic frame wrapper line cards 2, 3, and 4.

The timing signal is a pulse signal that is generated based on a reference pulse and is a signal that is generated so that a plurality of photonic frame wrapper apparatuses may perform transmission synchronization on photonic frames for each time slot. The photonic frame wrapper line cards 1, 2, 3, and 4 may transmit photonic frames based on the timing signal. Referring to FIG. 2, the timing signal is generated at a point in time at which a time slot 1 210 starts, and the photonic frame wrapper line cards 1, 2, 3, and 4 may transmit a photonic frame 1-1, a photonic frame 2-1, a photonic frame 3-1, and a photonic frame 4-1, respectively, based on the timing signal.

According to an example embodiment, when consecutively transmitting a plurality of photonic frames over an allocated time slot, a photonic frame wrapper line card may determine whether the photonic frames to be consecutively transmitted are transmitted to the same destination. When the photonic frames to be consecutively transmitted are to be transmitted to the same destination, the photonic frame wrapper line card may transmit the plurality of photonic frames without delaying the time slot.

In FIG. 2, it is assumed that each of the photonic frame wrapper line cards 1, 2, 3, and 4 consecutively transmits a plurality of photonic frames in the consecutively allocated time slot 1 210 and time slot 2 220. For example, when destinations of the photonic frame 1-1 and a photonic frame 1-2 match and destinations of the photonic frame 3-1 and a photonic frame 3-2 match, the time slot 2 220 may start without delay once the time slot 1 210 is terminated. That is, once the time slot 1 210 is terminated, the photonic frame wrapper line card 1 may generate a timing signal for the time slot 2 220.

When destinations of photonic frames to be consecutively transmitted are different, the photonic frame wrapper line card may delay a time slot by a guard time and may transmit a photonic frame in the delayed time slot. That is, the timing signal for the time slot may slide by the guard time.

Referring to FIG. 2, when it is assumed that destinations of photonic frame 2-2 and photonic frame 2-3 to be transmitted from the photonic frame wrapper line card 2 are different, the photonic frame wrapper line card 2 may change a wavelength used by a TLD from a wavelength corresponding to the destination of the photonic frame 2-2 to a wavelength corresponding to the destination of the photonic frame 2-3 at a point in time at which transmission of the photonic frame 2-2 is completed, that is, between the time slot 2 220 and a time slot 3 230. In this case, the photonic frame wrapper line card 2 may transmit a wavelength change notification signal to the photonic frame wrapper line cards 1, 3, and 4.

In response to receiving the wavelength change notification signal, the photonic frame wrapper line cards 1, 3, and 4 may insert a guard time 240 between the time slot 2 220 and the time slot 3 230. The photonic frame wrapper line cards 1, 3, and 4 may synchronize again a photonic frame transmission points in times based on a point in time at which the wavelength used by the TLD included in the photonic frame wrapper line card 2 is changed. That is, the guard time 240 may be determined based on a time at which a TLD included in a photonic frame wrapper line card changes a wavelength.

Referring to FIG. 2, by inserting the guard time 240 between the time slot 2 220 and the time slot 3 230, the photonic frame wrapper line card 1 may delay and thereby generate a timing signal for the time slot 3 230 by the guard time 240. The photonic frame wrapper line cards 1, 2, 3, and 4 may transmit photonic frames 1-3, 2-3, 3-3, and 4-3, respectively, based on the timing signal for the delayed and thereby generated time slot 3 230.

The aforementioned operation of the photonic frame wrapper line card may be controlled by a photonic frame wrapper apparatus included in the photonic frame wrapper line card. Hereinafter, a structure and an operation of the photonic frame wrapper apparatus are further described with reference to FIG. 3.

Figure 3:
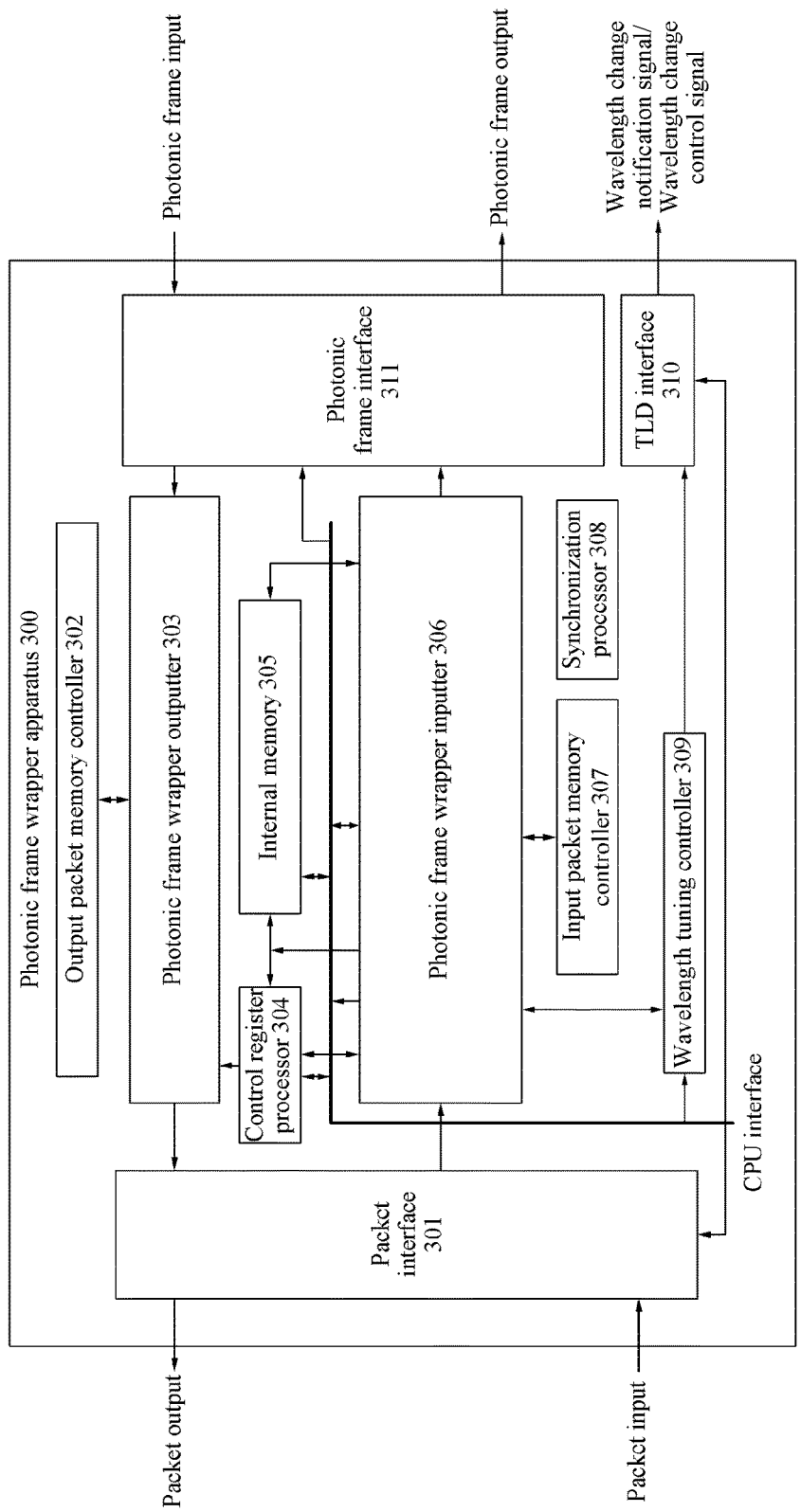
FIG. 3 is a diagram illustrating a structure of a photonic frame wrapper apparatus according to an example embodiment.

FIG. 3 is a diagram illustrating a structure of a photonic frame wrapper apparatus according to an example embodiment.

Referring to FIG. 3, an interface of a photonic frame wrapper apparatus 300 may include a packet interface 301 used to transmit and receive a packet with a data center or a server. The packet may be a subframe of a photonic frame as a layer 2 (L2) frame. The server may be connected to a photonic frame switching system that includes the photonic frame wrapper apparatus 300 over a network.

The interface of the photonic frame wrapper apparatus 300 may include a photonic frame interface 311 connected to a photonic switch fabric apparatus and used to transmit and receive a photonic frame. Further, the interface of the photonic frame wrapper apparatus 300 may request a main controller for scheduling of a time slot, and may receive a scheduling ACK signal from the main controller.

The photonic frame wrapper apparatus 300 may include an internal memory 305 configured to store a packet during a processing time required to generate a photonic frame. The internal memory 305 may include a dual-port random access memory (DPRAM). The internal memory 305 may store a packet according to a first in first out (FIFO) scheme. The internal memory 305 may temporarily store a packet when packet duplication such as broadcast or multicast is required.

The photonic frame wrapper apparatus 300 may include a control register processor 304. The control register processor 304 may control an operation of the photonic frame wrapper apparatus 300 and may manage state information of the photonic frame wrapper apparatus 300. The control register processor 304 may transfer control information exchanged between a photonic frame wrapper inputter 306 and a photonic frame wrapper outputter 303.

The photonic frame wrapper apparatus 300 may include the photonic frame wrapper outputter 303 configured to output, to a corresponding server, a packet extracted from a received photonic frame in response to receiving the photonic frame. Hereinafter, an operation of the photonic frame wrapper apparatus 300 that processes the photonic frame received from the photonic switch fabric apparatus is described. The photonic frame wrapper outputter 303 may receive the photonic frame through the photonic frame interface 311. The photonic frame wrapper outputter 303 may divide the received photonic frame into at least one packet. The photonic frame wrapper outputter 303 may store the divided at least one packet in an external memory of a photonic frame wrapper line card that includes the photonic frame wrapper apparatus 300.

The photonic frame wrapper apparatus 300 may include an output packet memory controller 302 configured to store the packet divided by the photonic frame wrapper outputter 303 in the external memory. To store the packet in the external memory, the photonic frame wrapper outputter 303 may transfer the packet to the output packet memory controller 302.

When transferring the packet to a corresponding server, the photonic frame wrapper outputter 303 may output the packet fetched from the external memory to the server through the packet interface 301. The photonic frame wrapper outputter 303 may fetch the packet from the external memory using the output packet memory controller 302. The output packet memory controller 302 may fetch, from the external memory, the packet to be transferred to the server and may output the fetched packet to the photonic frame wrapper outputter 303.

Hereinafter, an operation of the photonic frame wrapper apparatus 300 that processes the received packet through the packet interface 301 is described. The photonic frame wrapper apparatus 300 may include the photonic frame wrapper inputter 306 configured to generate the photonic frame based on at least one packet received through the packet interface 301.

The photonic frame wrapper inputter 306 may identify a destination of the packet received from the packet interface 301. The photonic frame wrapper inputter 306 may determine an output port of the photonic switch fabric apparatus corresponding to the identified destination. The photonic frame wrapper inputter 306 may classify the packet based on the determined output port.

The photonic frame wrapper apparatus 300 may include an input packet memory controller 307 configured to store, in the external memory, the packet of which the output port is determined by the photonic frame wrapper inputter 306. That is, the photonic frame wrapper inputter 306 may transfer the classified packet to the input packet memory controller 307.

The photonic frame wrapper apparatus 300 may include a synchronization processor 308 configured to request the connected main controller to allocate a time slot for transmitting the photonic frame. In detail, when the photonic frame wrapper inputter 306 receives information exceeding a preset threshold, for example, information associated with the packet, the synchronization processor 308 may transmit, to the main controller, a scheduling request signal that requests allocation of the time slot. In response to receiving a scheduling ACK signal from the main controller, the synchronization processor 308 may transfer the received scheduling ACK signal to the photonic frame wrapper inputter 306. In response to receiving a scheduling start signal, the synchronization processor 308 may transfer the received scheduling start signal to the photonic frame wrapper inputter 306.

The photonic frame wrapper inputter 306 may initialize a time slot counter based on the scheduling ACK signal or the scheduling start signal received from the synchronization processor 308. The photonic frame wrapper inputter 306 may identify a value of a time slot included in the scheduling ACK signal or the scheduling start signal. When the value of the time slot counter is the same as the identified value of the time slot, the photonic frame wrapper inputter 306 may receive the packet stored in the external memory through the input packet memory controller 307. In detail, before the time slot starts, the input packet memory controller 307 may fetch the packet stored in the external memory. The input packet memory controller 307 may transfer the fetched packet to the photonic frame wrapper inputter 306. The photonic frame wrapper inputter 306 may generate the photonic frame based on the received packet and may transfer the generated photonic frame to the photonic frame interface 311.

When a plurality of photonic frame wrapper apparatuses including the photonic frame wrapper apparatus 300 is connected to the main controller and the photonic frame wrapper apparatus 300 most initially receives the scheduling ACK signal from the main controller, the synchronization processor 308 may control synchronization processors of other photonic frame wrapper apparatuses not to transmit the scheduling start signal. Further, the synchronization processor 308 may transmit the scheduling start signal to the other photonic frame wrapper apparatuses.

In the case of transmitting a plurality of photonic frames having different destinations, the photonic frame wrapper apparatus 300 may include a wavelength tuning controller 309 configured to insert a preset guard time between a plurality of time slots respectively corresponding to the plurality of photonic frames. In detail, when a wavelength used by a TLD connected to the photonic frame wrapper apparatus 300 is changed, the wavelength tuning controller 309 may transmit a wavelength change notification signal to the other photonic frame wrapper apparatuses. Further, when there is a photonic frame wrapper apparatus that needs to change a wavelength at a point in time at which the time slot is changed, the wavelength tuning controller 309 may transmit, to the photonic frame wrapper apparatus, a wavelength change control signal that requests changing of the wavelength.

The photonic frame wrapper apparatus 300 may include a TLD interface 310 used to exchange the wavelength change control signal or the wavelength change notification signal.

Figure 4:
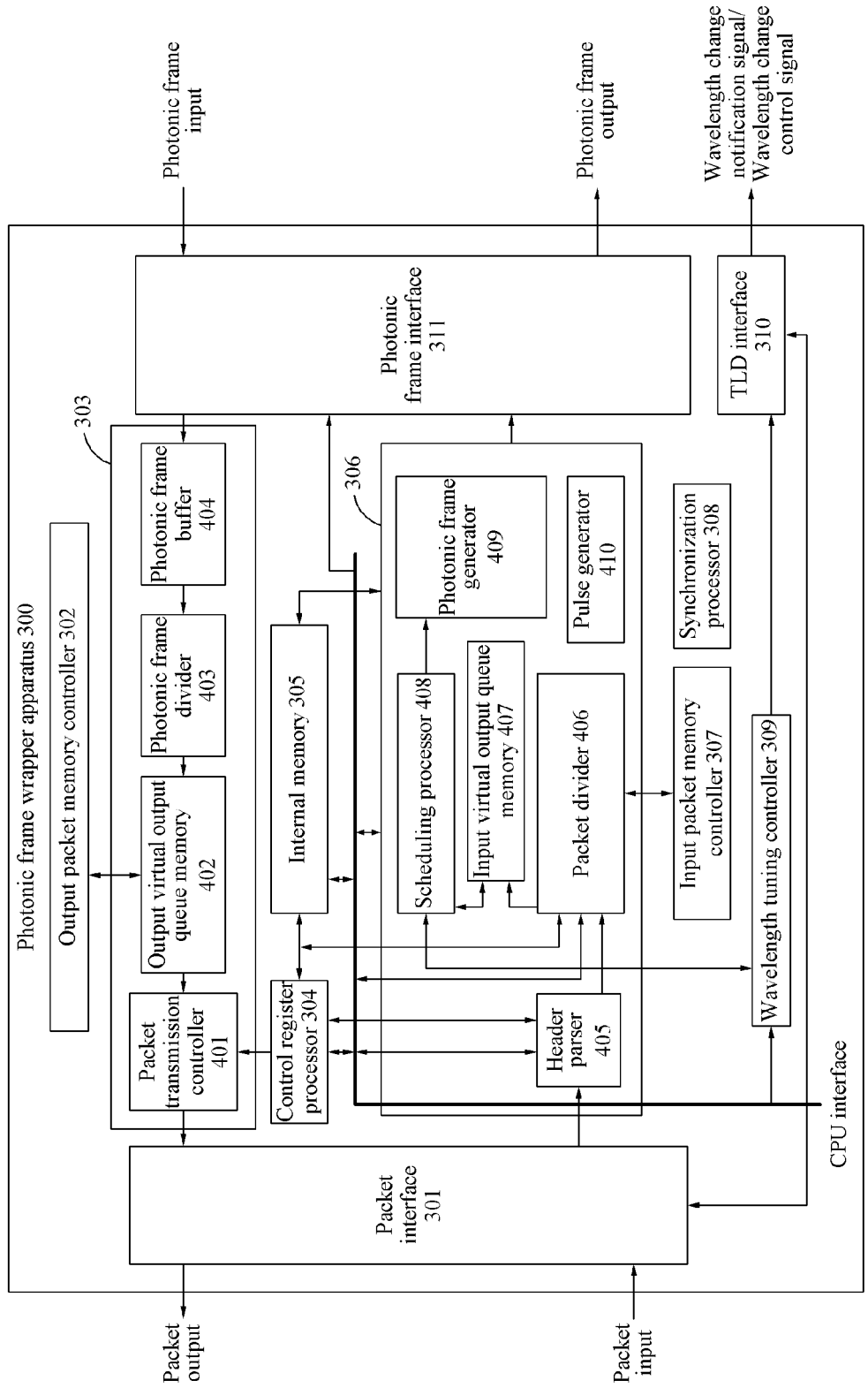
FIG. 4 is a diagram illustrating a detailed structure of a photonic frame wrapper apparatus according to an example embodiment.

FIG. 4 is a diagram illustrating a detailed structure of a photonic frame wrapper apparatus according to an example embodiment. A detailed structure of the photonic frame wrapper inputter 306 and the photonic frame wrapper outputter 303 is described with reference to FIG. 4.

The photonic frame wrapper apparatus 300 may transmit, to a corresponding destination, that is, a server, a packet extracted from a received photonic frame. Hereinafter, an operation of the photonic frame wrapper apparatus 300 that processes the received photonic frame is described with reference to FIG. 4.

Referring to FIG. 4, the photonic frame wrapper outputter 303 may include a photonic frame buffer 404 configured to store a photonic frame received through a photonic switch fabric apparatus. The photonic frame buffer 404 may temporarily store the photonic frame. The photonic frame buffer 404 may transmit the stored photonic frame to a photonic frame divider 403.

The photonic frame wrapper outputter 303 may include the photonic frame divider 403 configured to divide the photonic frame into at least one subframe. The photonic frame divider 403 may extract or restore at least one packet from the photonic frame. The photonic frame divider 403 may identify a destination of a packet. When a plurality of packets is extracted from the photonic frame, the photonic frame divider 403 may classify each of the plurality of packets based on a destination of each corresponding packet. The photonic frame divider 403 may store the classified packets in the external memory using the output packet memory controller 302.

The photonic frame wrapper outputter 303 may include an output virtual output queue memory 402 configured to store information associated with the classified packet based on the destination. For example, the output virtual output queue memory 402 may store a start address of the external memory of each of the classified packets or a length of each of the classified packets.

The photonic frame wrapper outputter 303 may include a packet transmission controller 401 configured to transmit a packet received from the external memory to a corresponding destination. The packet transmission controller 401 may request the external memory to transmit the packet based on the start address and the length of the packet stored in the output virtual output queue memory 402. When the packet is received from the external memory, the packet transmission controller 401 may output the received packet to the packet interface 301.

The photonic frame wrapper apparatus 300 may generate a photonic frame by grouping a plurality of received packets for each destination and may transmit the generated photonic frame to a corresponding destination. Hereinafter, an operation of the photonic frame wrapper apparatus 300 that generates the photonic frame from the received packet is described with reference to FIG. 4.

The photonic frame wrapper apparatus 300 may receive a packet through the packet interface 301. The received packet may be transferred from the packet interface 301 to the photonic frame wrapper inputter 306.

The photonic frame wrapper inputter 306 may include a header parser 405 configured to identify a destination of the packet by parsing a header of the packet. The header parser 405 may receive the packet from the packet interface 301. The header parser 405 may identify an address of the destination of the packet or a length of the packet.

The photonic frame wrapper inputter 306 may include a packet classifier 406 configured to classify the packet based on an output port corresponding to the destination identified by the header parser 405. The packet classifier 406 may retrieve an output port of a photonic switch fabric apparatus to which the packet is to be switched, based on the address of the identified destination. The packet classifier 406 may identify the output port of the photonic switch fabric apparatus corresponding to the destination.

The packet classifier 406 may generate a storage request signal for storing the packet in the external memory based on the output port. The packet classifier 406 may transmit the generated storage request signal to the input packet memory controller 307. In response to the storage request signal, the input packet memory controller 307 may store the packet in the external memory based on the output port. Accordingly, the external memory may store the packet based on the corresponding destination or output port.

The photonic frame wrapper inputter 306 may include an input virtual output queue memory 407 configured to store at least one of the output port corresponding to the packet, an address of the memory in which the packet is stored, and a length of the packet. The input virtual output queue memory 407 may receive the length of the packet from the header parser 405. The input virtual output queue memory 407 may receive, from the input packet memory controller 307, a start address of the external memory in which the packet is stored. The input virtual output queue memory 407 may store information associated with the packet based on the output port, based on the length and the start address of the received packet.

The photonic frame wrapper inputter 306 may include a scheduling processor 408 configured to exchange a scheduling request signal and a scheduling ACK signal with the synchronization processor 308. The scheduling processor 408 may control a time slot queue that includes information used to generate the photonic frame. The scheduling processor 408 may control a time slot counter and a photonic frame transmission point in time.

In detail, the scheduling processor 408 may determine whether a number of packets stored in the input virtual output queue memory 407 exceeds a preset threshold. When the number of packets exceeds the threshold, the scheduling processor 408 may transmit, to the synchronization processor 308, information of the input virtual output queue memory 407 that is required for the scheduling request.

In response to receiving the scheduling ACK signal or the scheduling start signal from the synchronization processor 308, the scheduling processor 408 may initialize the time slot counter. When the photonic frame wrapper apparatus 300 most initially receives the scheduling ACK signal from the main controller, the time slot counter may increase by each '1' according to a timing signal generated by a pulse generator 410. When the photonic frame wrapper apparatus 300 does not most initially receive the scheduling ACK signal from the main controller, the time slot counter may increase by each '1' according to a timing signal broadcast from another photonic frame wrapper apparatus.

The scheduling processor 408 may identify a value of a time slot allocated to the photonic frame wrapper apparatus 300 from the scheduling ACK signal that is received from the synchronization processor 308. The scheduling processor 408 may identify an output port corresponding to a photonic frame that is to be transmitted in the identified time slot. The scheduling processor 408 may move information associated with the packet stored in the input virtual output queue memory 407 to a time slot queue, based on the identified output port. The scheduling processor 408 may start preparation to transmit the photonic frame in the identified time slot by moving information associated with the packet to the time slot queue.

When a value of the time slot counter reaches a predetermined threshold of a previous transmission time slot, the scheduling processor 408 may request a photonic frame generator 409 to prepare generation and transmission of a photonic frame to be subsequently transmitted. In the case of reaching a preset point in time within the time slot, the scheduling processor 408 may request the photonic frame generator 409 to prepare transmission of a photonic frame corresponding to a subsequent time slot. The scheduling processor 408 may request the photonic frame generator 409 to prepare transmission of the photonic frame corresponding to the subsequent time slot by transferring a photonic frame generation trigger to the photonic frame generator 409.

The photonic frame wrapper inputter 306 may include the photonic frame generator 409 configured to generate a photonic frame by merging a plurality of packets. The photonic frame generator 409 may receive a request for preparing generation and transmission of the photonic frame from the scheduling processor 408. The photonic frame generator 409 may transfer information associated with the packet stored in the time slot queue to the input packet memory controller 307.

When a destination of a photonic frame to be transmitted in a current time slot is different from a destination of a photonic frame transmitted in a previous time slot, a TLD of the photonic frame wrapper apparatus 300 may change a wavelength to change an output port of the photonic switch fabric apparatus. In this case, the photonic frame generator 409 may generate a photonic preamble corresponding to the photonic frame to be transmitted in the current time slot. The photonic frame generator 409 may transmit the generated photonic preamble to the photonic frame interface 311 as a first transfer entity.

The photonic frame generator 409 may receive the packet stored in the external memory through the input packet memory controller 307. The photonic frame generator 409 may generate a photonic frame by generating subframes from the received packet and by merging the subframes. The photonic frame generator 409 may encapsulate the subframes into the photonic frame. The photonic frame generator 409 may transmit the photonic preamble in the same time slot as the photonic preamble and may transmit the encapsulated photonic frame to the photonic frame interface 311.

The photonic frame wrapper inputter 306 may include the pulse generator 410 configured to generate a pulse signal based on a synchronization clock received from a clock source of the photonic frame switching system. The pulse generator 410 may generate the pulse signal used to synchronize photonic frame transmission points in times of the plurality of photonic frame wrapper apparatuses. When the photonic frame wrapper apparatus 300 most initially receives the scheduling ACK signal from the main controller, the pulse generator 410 may generate a timing signal. When the photonic frame wrapper apparatus 300 transmits photonic frames having different destinations, the pulse generator 410 may generate a wavelength change notification signal so that a different photonic frame wrapper apparatus may insert a guard time. The pulse generator 410 may generate the pulse signal based on a preset interval.

Figure 5:
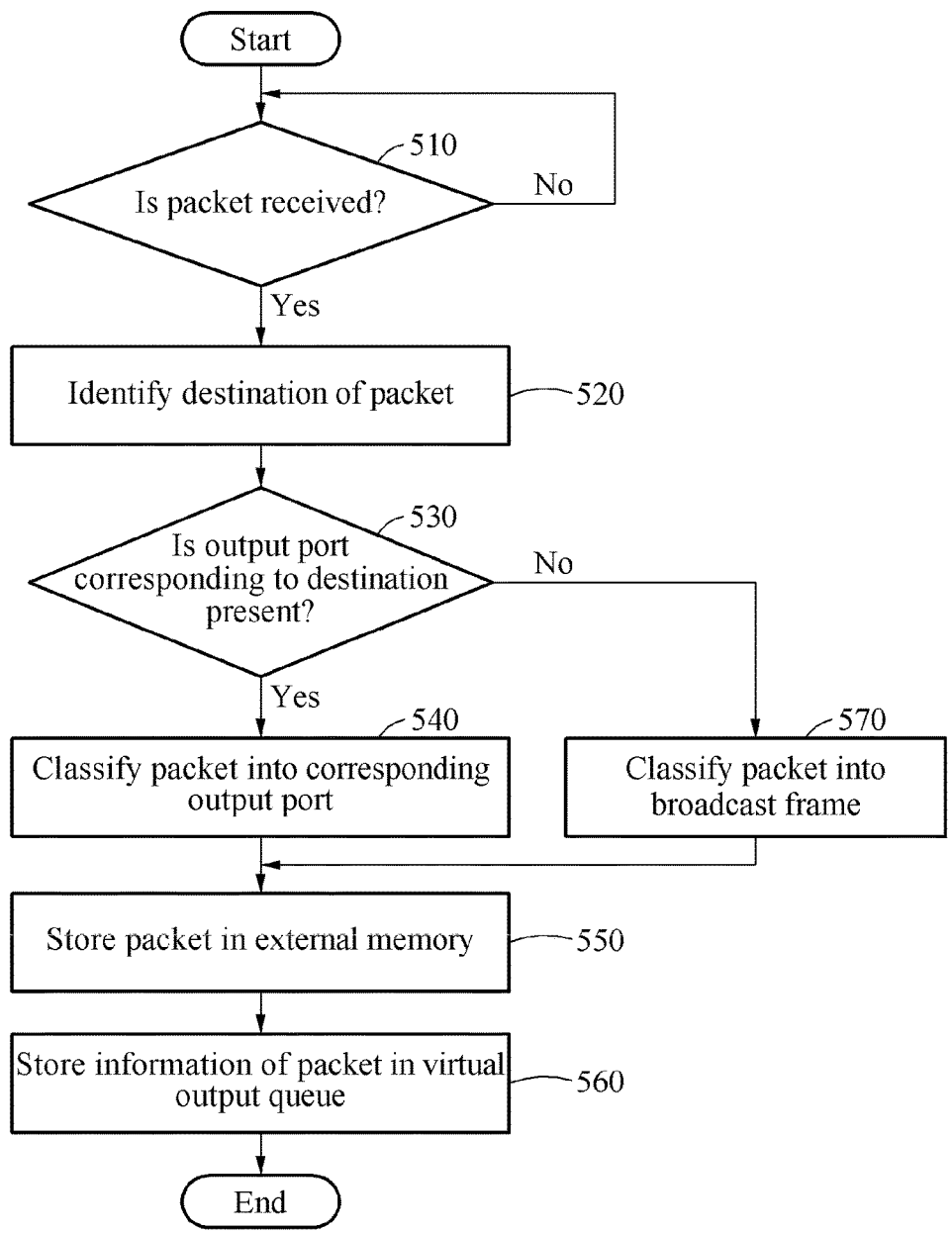
FIG. 5 is a flowchart illustrating a process of storing, by a photonic frame wrapper apparatus, a packet received through a packet interface in an external memory according to an example embodiment.

FIG. 5 is a flowchart illustrating a process of storing, by a photonic frame wrapper apparatus, a packet received through a packet interface in an external memory according to an example embodiment. Hereinafter, a photonic frame wrapper inputter of the photonic frame wrapper apparatus may perform the process of FIG. 5.

Referring to FIG. 5, in operation 510, the photonic frame wrapper apparatus may verify whether a packet is through a packet interface. When the packet is not received in operation 510, the photonic wrapper apparatus may wait until the packet is received. When the packet is received in operation 510, the photonic frame wrapper apparatus may identify a destination of the packet in operation 520. In detail, the photonic frame wrapper apparatus may identify an address of the destination of the packet by parsing a header of the packet. The address of the destination is an address used when performing layer 2 (L2) forwarding and may be a media access control (MAC) address or an address allocated by a tunnel scheme. The address of the destination may be an ID of a virtual local area network (VLAN) set based on an output port for each destination or a destination server. The ID of the VLAN may be provisioned based on an input port number or a MAC address.

In operation 530, the photonic frame wrapper apparatus may determine whether an output port corresponding to the destination is present. In detail, the photonic frame wrapper apparatus may retrieve an output port of a photonic switch fabric apparatus based on the address of the destination.

When the output port corresponding to the destination address is present in operation 530, the photonic frame wrapper apparatus may classify the packet into the corresponding output port in operation 540. On the contrary, when the output port corresponding to the destination address is absent in operation 530, the photonic frame wrapper apparatus may classify the packet into a broadcast frame in operation 570.

In operation 550, the photonic frame wrapper apparatus may store the classified packet into an external memory. The external memory may be included in a photonic frame wrapper line card corresponding to the photonic frame wrapper apparatus.

In operation 560, the photonic frame wrapper apparatus may store information associated with the packet in a virtual output queue. Information associated with the packet stored in the virtual output queue may include the output port corresponding to the packet, an address of the external memory in which the packet is stored, and a length of the packet.

Figure 6:
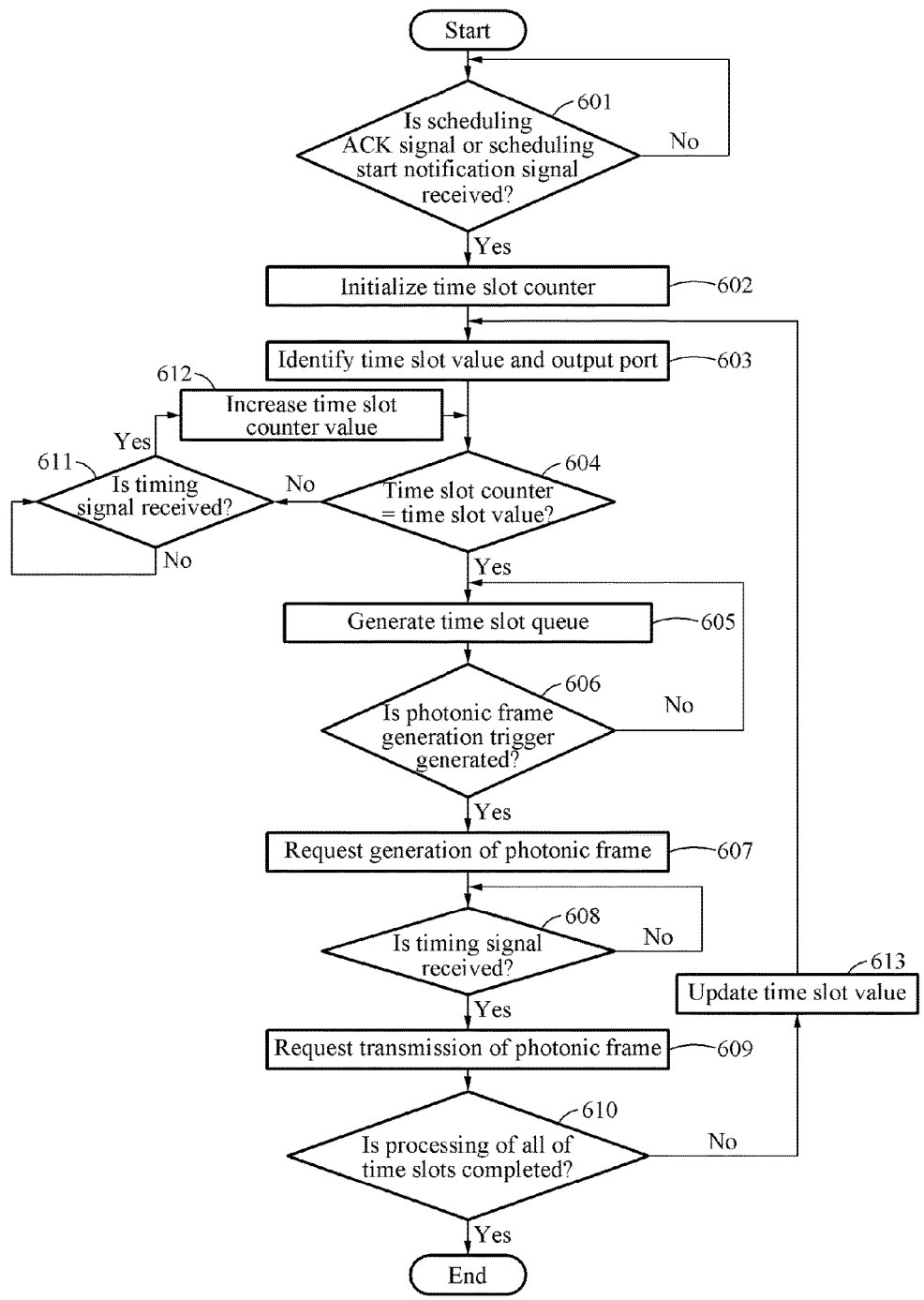
FIG. 6 is a flowchart illustrating a process of generating, by a photonic frame wrapper apparatus, a photonic frame according to an example embodiment.

FIG. 6 is a flowchart illustrating a process of generating, by a photonic frame wrapper apparatus, a photonic frame according to an example embodiment. A scheduling processor included in a photonic frame wrapper inputter of the photonic frame wrapper apparatus may perform the process of FIG. 6.

Referring to FIG. 6, in operation 601, the photonic frame wrapper apparatus may wait for receiving a scheduling ACK signal of a main controller or a scheduling start notification signal of another photonic frame wrapper apparatus that most initially receives the scheduling ACK signal. A synchronization processor of the photonic frame wrapper apparatus may transfer the received scheduling ACK signal or scheduling start notification signal to the scheduling processor, for example, the scheduling processor 408 of FIG. 4, of the photonic frame wrapper inputter.

In operation 602, the photonic frame wrapper apparatus may initialize a time slot counter based on the received scheduling ACK signal or scheduling start notification signal. For example, the photonic frame wrapper apparatus may change a value of the time slot counter to 0.

In operation 603, the photonic frame wrapper apparatus may identify a time slot value and an output port from the received scheduling ACK signal or scheduling start notification signal. The main controller may allocate a time slot to the photonic frame wrapper apparatus and may determine an output port to be used by the photonic frame wrapper apparatus in the allocated time slot. The scheduling ACK signal may include information associated with the allocated time slot and the determined output port.

In operation 604, the photonic frame wrapper apparatus may determine whether the identified time slot value and time slot counter match.

When the identified time slot value and time slot counter do not match, the photonic frame wrapper apparatus may wait for a timing signal indicating start of the time slot in operation 611. When the timing signal is received, the photonic frame wrapper apparatus may increase the time slot counter by "1" in operation 612. After increasing the time slot counter by 1, the photonic frame wrapper apparatus may determine again whether the time slot value and the time slot counter match in operation 604.

When the identified time slot value and time slot counter match, the photonic frame wrapper apparatus may generate a time slot queue including information used to generate the photonic frame in operation 605. The photonic frame wrapper apparatus may receive information associated with the packet used to generate the time slot queue from a virtual output queue. The photonic frame wrapper apparatus may store, in the time slot queue, information associated with a packet to be included in a photonic frame to be transmitted in a subsequent time slot.

In operation 606, the photonic frame wrapper apparatus may determine whether to generate a photonic frame generation trigger. The photonic frame generation trigger may be generated by the scheduling processor at a predetermined point in time within the time slot. To complete generation of a photonic frame corresponding to a previous time slot of a corresponding time slot, the photonic frame generation trigger may be generated at a point in time before the time slot corresponding to the photonic frame starts. That is, a photonic frame generation trigger associated with a specific time slot in a time slot group may be generated in a previous time slot of the specific time slot.

When the photonic frame generation trigger is not generated, the photonic frame wrapper apparatus may additionally receive information associated with the packet from the virtual output queue and may store the additionally received information in the time slot queue.

When the photonic frame generation trigger is generated, the photonic frame wrapper apparatus may request generation of a photonic frame based on information associated with the packet stored in the time slot queue at the point in time at which the photonic frame generation trigger is generated in operation 607. For example, the scheduling processor 408 of FIG. 4 may request the photonic frame generator 409 to generate the photonic frame using the time slot queue.

In operation 608, the photonic frame wrapper apparatus may determine whether a timing signal is received. When the timing signal is received, the photonic frame wrapper apparatus may increase the time slot counter by 1 in operation 609. In operation 609, the photonic frame wrapper apparatus may request transmission of the photonic frame. For example, the scheduling processor 408 of FIG. 4 may request the photonic frame generator 409 to output the generated photonic frame to a TLD. The TLD may output the photonic frame to the photonic switch fabric apparatus using a wavelength corresponding to the generated photonic frame.

In operation 610, the photonic frame wrapper apparatus may determine whether all of allocated time slots are processed within the time slot group included in the scheduling ACK signal.

When all of the allocated time slots are not processed, the photonic frame wrapper apparatus may update the time slot value with a value of an allocated subsequent time slot in operation 613. To process the subsequent time slot, the photonic frame wrapper apparatus may perform operation 603.

Figure 7:
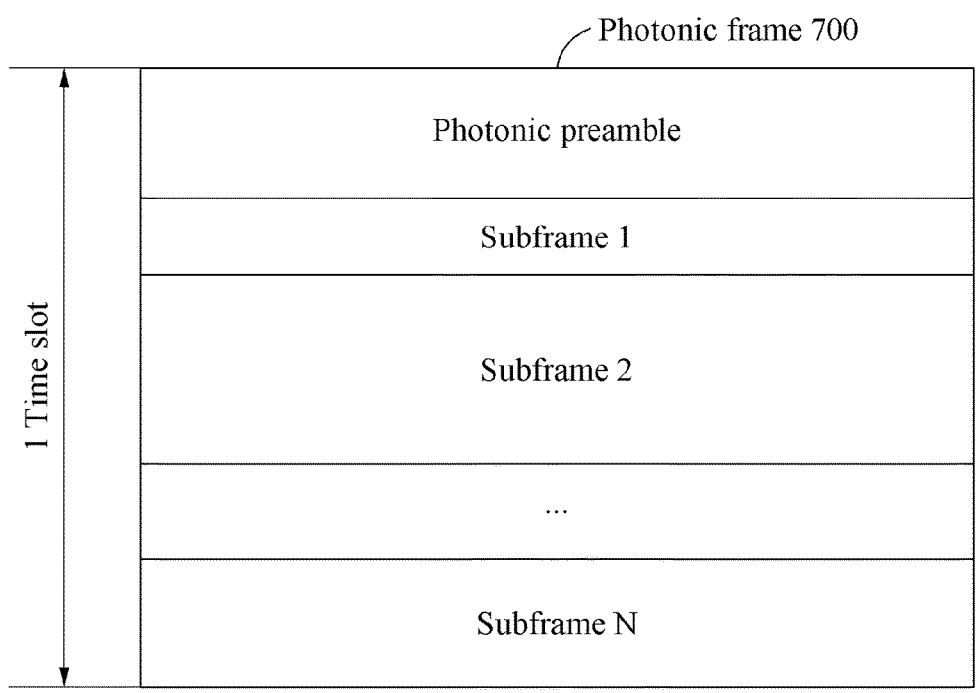
FIG. 7 illustrates a format of a photonic frame generated by a photonic frame wrapper apparatus according to an example embodiment.

FIG. 7 illustrates a format of a photonic frame generated by a photonic frame wrapper apparatus according to an example embodiment. Here, it is assumed that a photonic frame wrapper line card receives N packets having the same destination. The photonic frame wrapper line card may encapsulate a packet into a subframe. Referring to FIG. 7, the photonic frame wrapper line card may generate subframe 1 through subframe N by encapsulating the N packets. The photonic frame wrapper line card may generate a photonic frame 700 by combining the subframe 1 through the subframe N.

Referring to FIG. 7, the photonic frame 700 may include a photonic preamble including a photonic frame header and at least one subframe. A length of the photonic frame 700 may be determined based on a length of a time slot. The photonic preamble may be inserted when a destination of the photonic frame 700 is different from a destination of a photonic frame transmitted in a previous time slot. Accordingly, the length of the photonic frame 700 may be changed based on whether the photonic preamble is inserted.

The photonic preamble may be inserted when destinations of photonic frames consecutively transmitted from the photonic frame wrapper line card are different. Overhead according to insertion of the photonic preamble may decrease by determining whether the photonic preamble is inserted based on whether a destination change is present. Since overhead according to insertion of the photonic decreases, a photonic frame transmission efficiency may increase in an internal transfer network of a data center that uses a photonic frame switching system.

Figure 8:
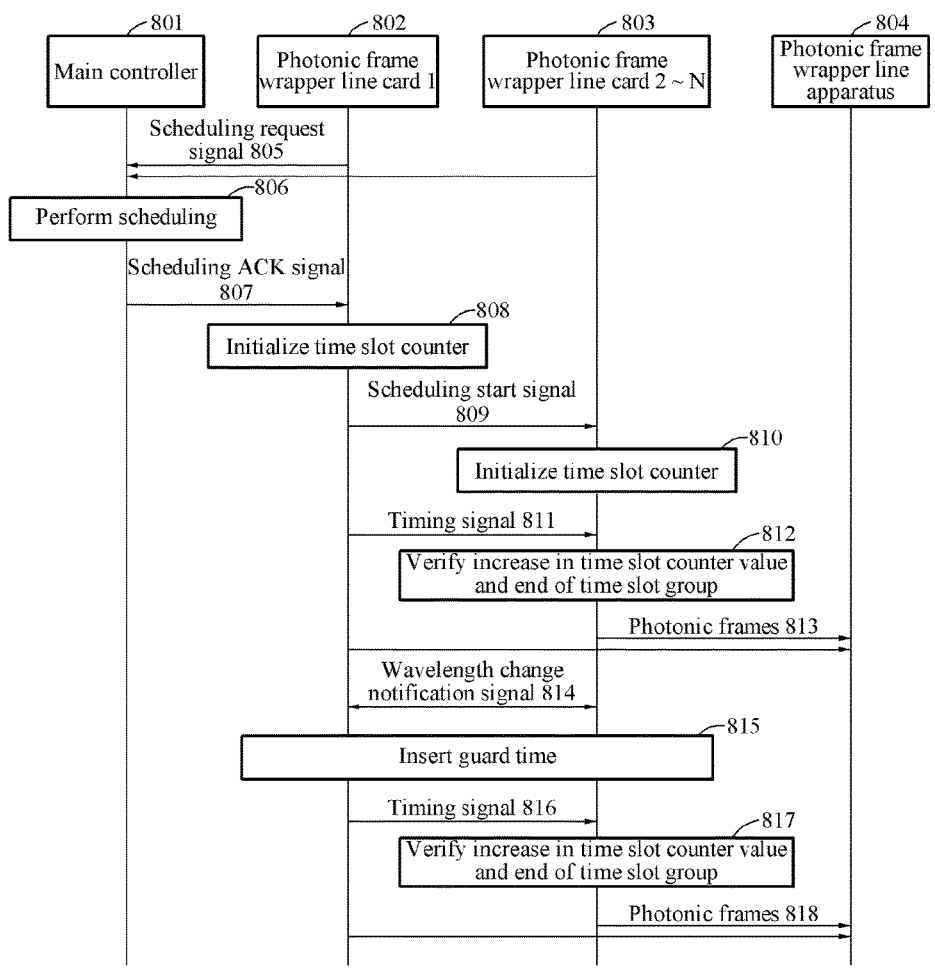
FIG. 8 is a flowchart illustrating an operation performed by each device included in a photonic frame switching system according to an example embodiment.

FIG. 8 is a flowchart illustrating an operation performed by each device included in a photonic frame switching system according to an example embodiment. Referring to FIG. 8, the photonic frame switching system may include at least one of a main controller 801, N photonic frame wrapper line cards, and a photonic switch fabric apparatus 804.

Photonic frame wrapper line cards 1 through N 802 and 803 may transmit a scheduling request signal 805 to the main controller 801 based on a packet stored in a virtual output queue. The scheduling request signal 805 may include information of the packet stored in the virtual output queue of the corresponding photonic frame wrapper line card. The packet information may include a length of the packet, an output port of the photonic switch fabric apparatus 804 that the packet passes, and the like.

In operation 806, the main controller 801 may perform scheduling based on at least one received scheduling request signal 805. The main controller 801 may allocate a time slot to the photonic frame wrapper line cards 1 through N 802 and 803. That is, the main controller 801 may transmit a packet transmission point in time of each of the photonic frame wrapper line cards 1 through N 802 and 803 using the time slot.

The main controller 801 may allocate the time slot so that a plurality of photonic frame wrapper line cards may transmit photonic frames to different output ports in the same time slot. Accordingly, it is possible to prevent collision between the photonic frames simultaneously transmitted from the plurality of photonic frame wrapper line cards. When the plurality of photonic frame wrapper line cards transmits the photonic frames to the same destination, the main controller 801 may allocate the time slot so that the plurality of photonic frame wrapper line cards may transmit the photonic frames in different time slots. That is, each of output ports of the photonic switch fabric apparatus 804 may switch a single photonic frame in a single time slot. The plurality of photonic frame wrapper line cards may use different wavelengths in all of the time slots.

The main controller 801 may transmit a time slot allocation result to the photonic frame wrapper line cards 1 through N 802 and 803 using a scheduling ACK signal 807.

Here, it is assumed that the photonic frame wrapper line card 1 802 most initially receives the scheduling ACK signal 807. In operation 808, the photonic frame wrapper line card 1 802 may initialize a time slot counter. The photonic frame wrapper line card 1 802 may transmit, to the photonic frame wrapper line cards 2 through N 803, a scheduling start signal 809 that is generated based on the scheduling ACK signal 807.

In operation 810, the photonic frame wrapper line cards 2 through N 803 may initialize the time slot counter in response to the received scheduling start signal 809. In operation 812, a value of the time slot counter of the photonic frame wrapper line cards 1 through N 802 and 803 may increase based on a timing signal 811 of the photonic frame wrapper line card 1 802.

Each of the photonic frame wrapper line cards 1 through N 802 and 803 may identify the allocated time slot and an output port corresponding to the allocated time slot based on the scheduling ACK signal 807 that is provided from the main controller 801. When the scheduling ACK signal 807 includes information associated with a group of a series of time slots, for example, a time slot group, each of the photonic frame wrapper line cards 1 through N 802 and 803 may identify at least one time slot for outputting a photonic frame.

The photonic frame wrapper line card 1 802 may broadcast a timing signal 811 indicating a start of the time slot based on information associated with the time slot included in the scheduling start signal 809. That is, the timing signal 811 may be transmitted to the photonic frame wrapper line cards 2 through N 803. The photonic frame wrapper line cards 1 through N 802 and 803 may simultaneously transmit photonic frames 813 using the timing signal 811.

When each of the photonic frame wrapper line cards 1 through N 802 and 803 transmits a plurality of photonic frames having different destinations, a preset guard time may be inserted between a plurality of time slots corresponding to the plurality of photonic frames. In particular, the photonic frame wrapper line cards 1 through N 802 and 803 may perform retiming of photonic frame transmission points in times by sharing information associated with insertion of the guard time.

For example, it is assumed that one of the photonic frame wrapper line cards 1 through N 802 and 803 changes a wavelength of a TLD based on a destination of a photonic frame 818 to be transmitted subsequently after the photonic frame 813 is transmitted. A photonic frame wrapper line card that changes the wavelength may request remaining photonic frame wrapper line card(s) to insert a guard time that is determined based on a time in which the TLD changes the wavelength. The photonic frame wrapper line card that changes the wavelength may inform that the wavelength of the TLD is changed by transmitting a wavelength change notification signal 814 to the remaining photonic frame wrapper line card(s).

In operation 815, the photonic frame wrapper line card(s) receiving the wavelength change notification signal 814 may insert the guard time between time slots. A point in time at which the photonic frame wrapper line card receiving the wavelength change notification signal 814 transmits the photonic frame 818 may be delayed by the guard time. A point in time at which the photonic frame wrapper line card corresponding to the changed wavelength transmits the photonic frame 818 may also be delayed by an amount of time in which the TLD changes the wavelength, that is, by the guard time. That is, points in times at which all of the photonic frame wrapper line cards 1 through N 802 and 803 transmit the photonic frames 818 may be delayed by the guard time.

The guard time may be used to change a point in time at which a timing signal 816 is transmitted. The photonic frame wrapper line card 1 802 may delay the timing signal 816 at a point in time delayed by the guard time. The photonic frame wrapper line cards 1 through N 802 and 803 may transmit the photonic frames 818 based on the timing signal 816 delayed by the guard time. Accordingly, although photonic frame transmission points in times of a portion of the photonic frame wrapper line cards 1 through N 802 and 803 are delayed due to a destination change, all of the photonic frame wrapper line cards 1 through N 802 and 803 may simultaneously transmit photonic frames. Accordingly, the photonic frames may not collide with each other in the photonic switch fabric apparatus 804.

Further, the photonic frame wrapper line cards 1 through N 802 and 803 may generate a photonic frame by encapsulating packets for each destination. Accordingly, a transmission bandwidth efficiency may be enhanced. In particular, a photonic preamble of a photonic frame may be inserted into a photonic frame to be subsequently transmitted when a destination of a previously transmitted photonic frame and a destination of the photonic frame to be subsequently transmitted differ from each other. When the destination of the previously transmitted photonic frame and the destination of the photonic frame to be subsequently transmitted are the same as each other, the photonic preamble may not be inserted into the photonic frame. Accordingly, an amount of packets to be transmitted through a time slot may increase. Since the photonic preamble is not inserted into the photonic frame, overhead according to generation of the photonic preamble may be reduced. The photonic frame switching system may support switching of a high throughput photonic frame.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A photonic frame switching system comprising:
a plurality of photonic frame wrapper line cards each configured to generate a photonic frame by merging a plurality of packets based on a destination; and
a main controller configured to transfer, to the plurality of photonic frame wrapper line cards, a scheduling acknowledgement (ACK) signal including information associated with a time slot that indicates a time at which the plurality of photonic frame wrapper line cards simultaneously transmits the photonic frames,
wherein each of the plurality of photonic frame wrapper line cards is configured to insert a preset guard time between a plurality of time slots corresponding to the plurality of photonic frames in response to transmitting a plurality of photonic frames having different destinations, and
wherein each of the plurality of photonic frame wrapper line cards comprises:
a tunable laser diode configured to output the photonic frame using a wavelength corresponding to the destination; and
a photonic frame wrapper apparatus configured to request the plurality of photonic frame wrapper line cards to insert the guard time, the guard time being set based on a time at which the tunable laser diode changes the wavelength, in response to transmitting the plurality of photonic frames having different destinations.

2. The photonic frame switching system of claim 1, wherein the photonic frame wrapper apparatus is configured
to identify a destination of each of the plurality of packets by parsing a header of each of the plurality of packets,
to classify the plurality of packets based on an output port corresponding to the identified destination,
to store the plurality of classified packets in a packet memory, and
to store at least one of an output port corresponding to each of the plurality of classified packets, an address of a memory in which each of the plurality of classified packets is stored, and a length of each of the plurality of classified packets in a virtual output queue memory.

3. The photonic frame switching system of claim 2, wherein the photonic frame wrapper apparatus is configured to request the main controller to generate the scheduling ACK signal when a number of the plurality of packets stored in the virtual output queue memory exceeds a preset threshold.

4. The photonic frame switching system of claim 1, wherein the photonic frame wrapper apparatus is configured
to initialize a time slot counter based on the scheduling ACK signal,
to generate a time slot queue including information used to generate the photonic frame when the time slot counter matches a time slot value included in the scheduling ACK signal,
to generate the photonic frame based on the generated time slot queue, and
to output the generated photonic frame to the tunable laser diode in response to receiving a timing signal indicating a start of the time slot.

5. The photonic frame switching system of claim 4, wherein the photonic frame wrapper apparatus is configured to increase a value of the time slot counter in response to receiving the timing signal when the time slot counter does not match the time slot value, and to determine whether the time slot counter matches the time slot value.

6. The photonic frame switching system of claim 1, wherein the photonic frame wrapper apparatus is configured to insert a photonic preamble generated based on a different destination into a photonic frame that is subsequently transmitted among the plurality of photonic frames in response to transmitting the plurality of photonic frames having different destinations.

7. The photonic frame switching system of claim 1, wherein a photonic frame wrapper line card that most initially receives the scheduling ACK signal from the main controller is configured to transmit, to remaining photonic frame wrapper line cards among the plurality of photonic frame wrapper line cards, a timing signal indicating a start of the time slot based on the received scheduling ACK signal.

8. The photonic frame switching system of claim 1, wherein the plurality of photonic frame wrapper line cards is configured to output the generated photonic frame to a photonic switch fabric apparatus of which a switching path is determined for each wavelength, based on the time slot.

9. The photonic frame switching system of claim 1, wherein each of the plurality of photonic frame wrapper line cards is configured
to extract a packet that is included in a photonic frame transferred to the photonic frame switching system, and
to transmit the extracted packet to a corresponding server.

10. The photonic frame switching system of claim 1, wherein the main controller is configured to generate the scheduling ACK signal so that the plurality of photonic frame wrapper line cards transmits the photonic frames in different time slots, respectively, when the plurality of photonic frame wrapper line cards transmits the photonic frames to the same destination.

11. A photonic frame wrapper apparatus comprising:
a photonic frame wrapper inputter configured to generate a photonic frame based on a plurality of packets;
a synchronization processor configured to, based on determining that the photonic frame wrapper inputter has received information exceeding a preset threshold, request a main controller connected to the photonic frame wrapper apparatus to allocate a time slot for transmitting the generated photonic frame, and
a wavelength tuning controller configured to insert a preset guard time between a plurality of time slots corresponding to a plurality of photonic frames in response to transmitting the plurality of photonic frames having different destinations,
wherein the guard time is determined based on a time at which a tunable laser diode configured to output the photonic frame changes a wavelength.

12. The photonic frame wrapper apparatus of claim 11, wherein the photonic frame wrapper inputter comprises:
a header parser configured to identify a destination of each of the plurality of packets by parsing a header of each of the plurality of packets;
a packet classifier configured to classify the plurality of packets based on an output port corresponding to the identified destination;

a virtual output queue memory controller configured to store an output port corresponding to each of the plurality of classified packets, an address of a memory in which each of the plurality of classified packets is stored, and a length of each of the plurality of classified packets in a virtual output queue memory;

a photonic frame generator configured to generate a photonic frame by merging the plurality of classified packets; and a scheduling processor configured to request the photonic frame generator to generate the photonic frame based on the allocated time slot.

13. The photonic frame wrapper apparatus of claim 12, wherein the synchronization processor is configured to request the main controller to allocate the time slot when a number of the plurality of packets stored in the virtual output queue memory exceeds a preset threshold.

14. The photonic frame wrapper apparatus of claim 12, wherein the synchronization processor is configured to transfer information associated with the time slot included in a scheduling acknowledgement (ACK) signal to the scheduling processor when the main controller transmits the scheduling ACK signal in response to the request.

15. The photonic frame wrapper apparatus of claim 12, wherein the scheduling processor is configured
to initialize a time slot counter in response to receiving information associated with the time slot allocated by the main control,
to generate a time slot queue including information used to generate the photonic frame when the time slot counter matches a time slot value included in the received information,
to request the photonic frame generator to generate the photonic frame based on the generated time slot queue, and
to request the photonic frame generator to start transmission of the generated photonic frame in response to receiving a timing signal indicating start of the time slot.

16. The photonic frame wrapper apparatus of claim 15, wherein the scheduling processor is configured to increase a value of the time slot counter in response to receiving the timing signal when the time slot counter does not match the time slot value, and to determine whether the time slot counter matches the time slot value.

17. The photonic frame wrapper apparatus of claim 11, further comprising:
a photonic frame wrapper outputter configured to output a packet extracted from the received photonic frame to a corresponding server, in response to receiving the photonic frame.

18. A photonic frame switching system comprising:
a plurality of photonic frame wrapper line cards each configured to generate a photonic frame by merging a plurality of packets based on a destination; and
a main controller configured to transfer, to the plurality of photonic frame wrapper line cards, a scheduling acknowledgement (ACK) signal including information associated with a time slot that indicates a time at which the plurality of photonic frame wrapper line cards simultaneously transmits the photonic frames,
wherein each of the plurality of photonic frame wrapper line cards is configured to insert a preset guard time between a plurality of time slots corresponding to the plurality of photonic frames in response to transmitting a plurality of photonic frames having different destinations, and
wherein a photonic frame wrapper line card that most initially receives the scheduling ACK signal from the main controller is configured to transmit, to remaining photonic frame wrapper line cards among the plurality of photonic frame wrapper line cards, a timing signal indicating a start of the time slot based on the received scheduling ACK signal.

* * * * *